Figure 1:
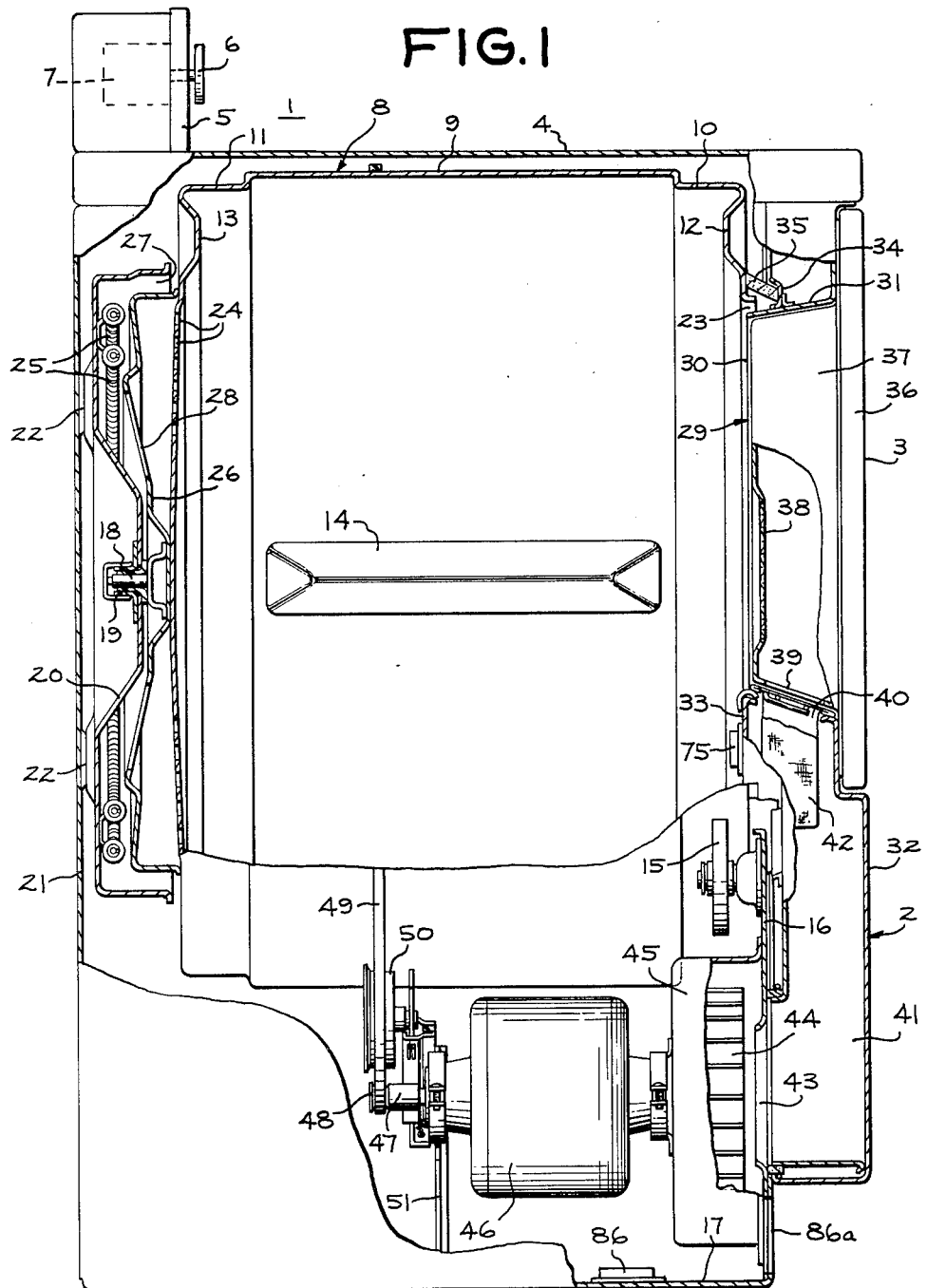

Dec. 21, 1965  G. R. CHAFEE, JR  3,224,107
AMBIENT-COMPENSATED CONTROL SYSTEM FOR CLOTHES DRYERS
Filed Oct. 10, 1963  2 Sheets-Sheet 2

INVENTOR.
GLENN R. CHAFEE JR.
BY Derek P Lawrence
HIS ATTORNEY

United States Patent Office 3,224,107
Patented Dec. 21, 1965

3,224,107
AMBIENT-COMPENSATED CONTROL SYSTEM
FOR CLOTHES DRYERS
Glenn R. Chafee, Jr., Louisville, Ky., assignor to General
Electric Company, a corporation of New York
Filed Oct. 10, 1963, Ser. No. 315,307
6 Claims. (Cl. 34—45)

This invention relates to clothes drying machines, and more particularly to automatic temperature-sensitive control systems which compensate for variations in the ambient temperature.

There are at the present time several domestic clothes drying machines commercially available where the length of the drying cycle is controlled indirectly by the dryness of the clothes. This is generally effected by using a thermostatic control, on the basis that a predetermined rise in the clothes temperature indicates that the heat supplied to the clothes is no longer being used to vaporize moisture from them, but instead is free to raise the temperature. In other words, such control systems utilize a predetermined high temperature as a trip point for shutting off the means provided for heating the clothes. Depending upon other structural features of different drying machines, a single such occurrence or several such occurrences may be provided in a single drying sequence.

In either event, it is important for optimum operation that suitable changes be made to the trip temperature, at which the heaters are shut off, to compensate for variations in the ambient temperature. This results from the fact that when the temperature of the air taken in to be heated and circulated through the clothes container is quite low, it lowers the temperature to which the heaters can raise the air before it enters the container.

Thus, for instance, where a thermostat is so calibrated that it trips when clothes are dry and the air is being taken in at an ambient temperature of 70° F., should the ambient temperature drop to 50° F. a greater temperature rise will be necessary for the thermostat to be tripped unless suitable compensation is made. This will have the result, if not compensated for, of excessively lengthening the drying cycle with the result that the clothes are dry before the end of the cycle. Similarly, if the ambient temperature were to rise to 90° F. in such a case, the thermostat would be tripped after a smaller temperature rise and the clothes might well not be dry enough. Because of this, it is important to provide suitable compensating means responsive to the temperature of the ambient air being drawn into the dryer.

One approach to effecting compensation of the trip temperature of the thermostat in accordance with changes in the ambient temperature is to provide a thermistor, that is, a resistor whose resistance varies substantially with the temperature, either negatively or positively. The thermistor is so positioned that it senses ambient temperature, and is in a circuit with a biasing heater positioned to affect the thermostat. The thermistor causes the biasing heater to provide less heat, and thereby raises the effective trip temperature of the thermostat, when the ambient temperature is high. When the ambient temperature is low, the biasing heater provides more heat and thereby lowers the effective trip temperature of the thermostat. Such an arrangement is, for instance, shown in Patent 3,050,865, issued on August 28, 1962, to Everett D. Morey, and assigned to General Electric Company, assignee of the present invention.

It has been found, however, that there is somewhat of a tendency with resistors of the type described, i.e., thermistors to have a self-heating effect when any substantial amount of electrical power is used to energize them. This in turn means that the thermistor will not only sense ambient temperatures but will also have a tendency to heat itself thereby introducing a factor of error into the system.

It is, therefore, an object of this invention to provide an improved ambient compensation system for a dryer control, wherein a thermistor may be used without the undesirable self-heating effect.

It is a further more specific object of my invention to achieve this goal by use of a transistor.

A further specific object of the invention is to provide such a thermistor and transistor arrangement, wherein the source of energy is a winding in the motor which causes operation of the dryer.

In carrying out the invention in one form thereof I provide a clothes drying machine which, in the usual manner, has a clothes container with suitable means including an electric motor for effecting tumbling of clothes in the container. The electric motor in this case is preferably an induction-type motor, and in any event includes an auxiliary winding suitable for providing a low-voltage output; this may, of course, either be an entirely separate winding, or else may be tapped portion of the start winding which is conventionally provided in such motors and is disconnected from the power source during motor operation. The clothes in the container are dried by the operation of a main heater which is shut off at a predetermined high temperature by thermostatic means positioned to be responsive to the temperature of the clothes.

A suitable ambient compensation system includes a transistor, and means for rectifying the output of the auxiliary winding for the transistor. It will be understood that transistors are, inherently, rectifiers, and that they may be formed of suitable alloys so as to be protected against higher reverse voltage than usual; this approach permits them to be used as self-rectifiers. In other words, the rectifying means may actually be included in the transistor itself by using an alloy of a suitable formulation for the transistor material.

A variable resistor, i.e., a thermistor, is provided in such a position that it senses ambient air temperature. This thermistor, together with another resistor, are connected together at one end to the base of the transistor, and have their other ends connected across the auxiliary motor winding so as to be energized thereby when the motor is in operation. The fact that the thermistor has a resistance which varies with temperature means that there will be a corresponding variation in the bias of the transistor, with a resulting variation in the amount of current passing from the emitter to the collector of the transistor.

An electric resistance-type biasing heater is positioned in heating relation to the thermostatic means so that the heat put out by the biasing heater tends to decrease the amount of heat required from the clothes in order to cause the thermostatic means to shut off the main heater. One of the resistors has its other end connected to the transistor emitter in an emitter loop, and the other resistor has its other end connected to the collector in a collector loop. The biasing heater is connected with one of the resistors in one of these loops, with the connection of the auxiliary winding being between the biasing heater and the one resistor.

With this structure, and with the parts suitably calibrated, a change in the resistance of the thermistor causes a change in the level of energization of the biasing heater such that the clothes temperature required to shut off the main heater rises and falls as the ambient temperature rises and falls, thereby eliminating the undersirable effect of variations in the ambient.

The subject matter which I regard as my invention is particularly pointed out and distinctly claimed in the concluding portion of this specification. My invention, however, both as to organization and method of operation, together with further objects and advantages thereof, may best be understood by reference to the following description taken in conjunction with the accompanying drawings.

Figure 2:
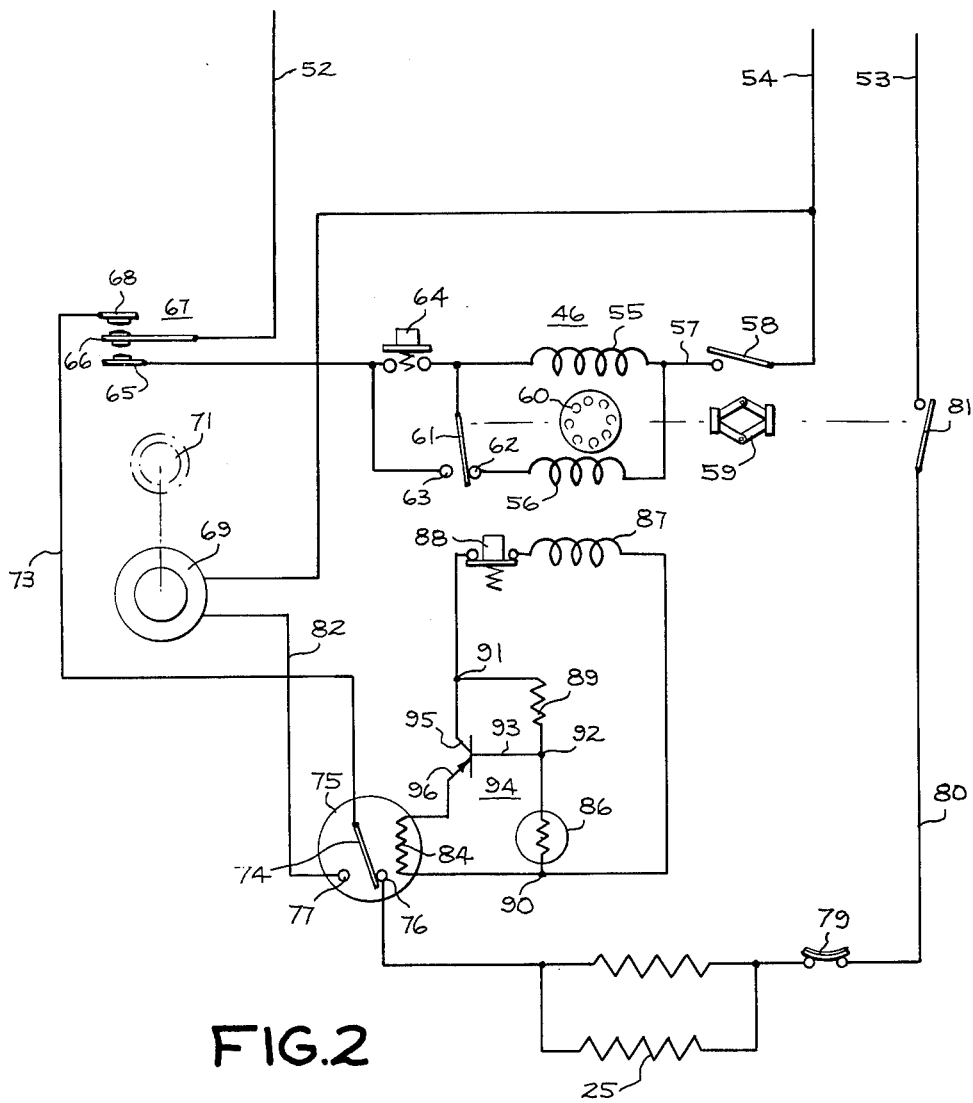

In the drawings,

FIGURE 1 is a side elevational view of a clothes dryer incorporating my improved dryer control arrangement, the view being partly broken away and partly sectionalized to illustrate details; and FIGURE 2 is a schematic illustration of my improved control circuit.

Referring now to FIGURE 1, the machine illustrated is a domestic clothes dryer generally indicated by the numeral 1. Dryer 1 is provided in the usual way with a cabinet 2 having a front door 3 to provide access to the interior of the cabinet for loading or unloading clothes. Provided on the top wall 4 of cabinet 2 is a control panel 5 which may, in the conventional way, include a suitable manual control 6 connected to a sequence control assembly 7 mounted in panel 5. By manual presetting of control 6, the machine may be caused to start, and automatically proceed through a cycle of operation.

Within cabinet 2, there is provided a clothes tumbling container, or drum, 8 mounted for rotation on a substantially horizontal axis. Drum 8 is substantially cylindrical in shape, having a first cylindrical wall portion 9, second and third outer cylindrical wall portions 10 and 11 located respectively adjacent the front and back of the drum, a front wall 12, and a back wall 13. Outer wall portions 9, 10 and 11 are imperforate over their entire length so that the outer shell of the basket is imperforate. On the interior surface of central portion 9 there may be provided a plurality of clothes tumbling ribs 14 so that clothes are lifted up when the drum rotates, and then tumble back down to the bottom of the basket.

The front of drum 8 may be rotatably supported within outer casing 2 by suitable idler wheels, one of which is shown by the numeral 15. These wheels are rotatably secured to the top of a member 16 which extends up from base 17 of the machine. Wheels 15 are disposed beneath the drum in contact with portion 10 thereof so as to support portion 10 on each side to provide a stable support.

The rear end of drum 8 receives its support by means of a stub shaft 18 extending from the center of wall 13. Shaft 18 is secured within a bearing 19 formed in a baffle 20 which in turn is rigidly secured to the back wall 21 of cabinet 2 by any suitable means such as, for instance, welding at a number of points 22. With the arrangement shown the basket may rotate on a horizontal axis, with rollers 15 providing the front support and stub shaft 18 within bearing 19 providing the rear support.

In order to provide for the flow of a stream of drying air through the clothes drum, the drum is provided with a central aperture 23 in its front wall 12 and with an opening in the form of a plurality of perforations 24 in its rear wall 13, the perforations in the present case being formed to extend around the rear wall in an annulus.

As has been stated, baffle member 20 is rigidly secured to rear wall 21 of cabinet 2. Baffle member 20 also serves to support heating means such as electrical heating elements 25 appropriately insulated from the baffle member. Elements 25 may be annular in shape so as to be generally coextensive with perforations 24 in drum 8. A baffle member 26 is rigidly secured to the back wall 13 of the drum outside the ring of perforations 24 and within the stationary baffle 20, so that an annular air inlet 27 is in effect formed by baffles 20 and 26. In this manner a passage is formed for air to enter annular inlet opening 27 between the baffles, pass over the heater 25, and then pass through openings 28 formed in baffle 26 to the interior of drum 8.

The front opening 23 of the drum is substantially closed by means of a stationary bulkhead generally indicated by the numeral 29. Bulkhead 29 is made up of a number of adjacent members including the inner surface 30 of access door 3, a stationary frame 31 for the door formed as a flange of front wall 32 of the cabinet, the inner surface member 33 of an exhaust duct which is formed by the cooperation of member 33 with the front wall 32 of the cabinet, and an annular flange 34 mounted on frame 31 and on the duct wall. It will be noted that a suitable clearance is provided between the inner edge of the drum opening 23 and the edge of bulkhead 29 so that there is no rubbing between the drum and the bulkhead during rotation of the drum. In order to prevent any substantial air leakage through opening 23 between the interior and the exterior of the drum, a suitable ring seal 35, preferably formed of felt-like material, is secured to flange 34 in sealing relationship with the exterior surface of drum wall 12.

Front opening 23, in addition to serving as part of the air flow path through the drum, also serves as a means whereby clothes may be loaded into and unloaded from the drum. Door 3, whose inner surface forms part of the bulkhead closing the opening, is mounted on cabinet 2 so that when the door is opened clothes may be inserted into or removed from the drum through the door frame 31. It will be noted that the door includes an outer flat imperforate section 36 and an inwardly extending hollow section 37 mounted on the flat outer section. Hollow section 37 extends into the door frame 31 when the door is closed, and the door surface 30 which comprises part of the combination bulkhead 29 is actually the inner wall of the hollow section.

The air outlet from the drum is provided by a perforated opening 38 formed in the inner wall 30 of hollow door section 37. The bottom wall section of door 3 and the adjacent wall of door frame 31 are provided with aligned openings 39 and 40, opening 40 providing the entrance of the duct 41 formed by the cooperation of member 33 with front wall 32. As shown, a lint trap 42, which may comprise a fine mesh bag, is preferably positioned in the exhaust duct 41 at opening 40, the bag being supported by the door frame 31.

Duct 41 leads downwardly to an opening 43 formed in the member 16 which supports wheels 15. Opening 43 constitutes the inlet to a blower member 44 contained within a housing 45 and directly driven by an electric motor 46. The blower draws ambient air in over the heaters 25, then through the basket, then through the door 3 and the duct 41, and then into the blower. From the blower the air passes through any appropriate duct (not shown) out of cabinet 2 so as to be exhausted from the machine.

In addition to driving blower 44, motor 46 constitutes the means for effecting rotation of drum 8. In order to effect this, motor 46 is provided with a shaft 47 having a small pulley 48 formed at the end thereof. A belt 49 extends around pulley 48 and also entirely around the cylindrical wall section 9 of drum 8. The relative circumferences of pulley 48 and wall section 9 cause the drum to be driven by the motor at a speed suitable to effect tumbling of the clothes therein. In order to effect proper tensioning of belt 49, there may be provided a suitable idler assembly 50 secured on the same support 51 which secures one end of the motor. Thus, the air is pulled through the drum and at the same time the fabrics in the drum are tumbled. When the air is heated by heating elements 25, the heated air passing through the drum causes vaporization of moisture from the clothes. The vapor is carried off with the air as it passes out of the machine.

The operation of dryer 1 is controlled by the new and improved control system shown in the circuit diagram of FIGURE 2. As shown therein, the entire control system of the machine may be energized across a 3-wire power supply system which includes supply conductors 52 and 53, and a neutral conductor 54. For domestic use, conductors 52 and 53 will normally be connected across a 220 volt power supply, with 110 volts appearing between the neutral line 54 and each of the conductors, and with the neutral line being at ground voltage. Motor 46, connected between conductors 52 and 54, is a single-phase induction-type motor having a main winding 55 and a start winding 56 both connected at a common end to a conductor 57. Through a conventional door switch 58 (which is closed when door 3 is closed, and is open when the door is open), conductor 57 is connected to conductor 54.

The start winding 56 is connected in parallel with main winding 55 under the control of a speed responsive device, such as that shown at 59, which is schematically shown as connected to rotor 60 of the motor. The speed responsive device 59 controls a switch 61 which is engageable with either contact 62 or contact 63, being engaged with contact 62 when the machine is at rest and moving into engagement with contact 63 as the motor comes up to speed. It can readily be seen that engagement with contact 62 connects the start winding 56 in parallel with main winding 55, while movement of switch 61 away from this position opens the start winding. Thus, as rotor 60 comes up to speed, the start winding becomes de-energized and the motor then continues to run on the main winding 55 alone.

The starting of the motor is provided by a manually operable switch 64 which may, for instance, in the structure of FIGURE 1, be moved to its closed position by pulling out on member 6. Switch 64 connects the motor to supply conductor 52 through contacts 65 and 66 of a switch 67 which also includes a third contact 68. Switch 64 is normally biased to the open position shown. However, when member 6 is pulled out manually, and provided switch 67 is closed, energization of the motor is provided. Within less than a second then, under normal circumstances, the motor comes up to speed so that switch 61 engages contact 63. As a result of this movement of the centrifugally operated switch 61, the main winding 55 of motor 46 continues to be energized by a bypass around switch 64 when member 6 is released and switch 64 opens.

A timer motor 69 controls a cam 71 which in turn controls switch 67. Cam 71 is also movable by rotation of member 6, so that when operation of the machine is desired, member 6 may be rotated until cam 71 causes switch 67 to close all three of its contacts. The machine operation is terminated, as will be seen herebelow, when cam 71 has been rotated sufficiently by the timer motor 69 to open the contacts of switch 67.

An energizing circuit is also completed for heater 25 through the following circuit.. Starting at conductor 52, the circuit proceeds through contacts 66 and 68 of switch 67, and then through a conductor 73 to a contact arm member 74 forming part of a thermostat 75. Contact arm 74 is engageable with either of contacts 76 and 77. When it is engaged with contact 76, as shown, the circuit then proceeds through a conductor 78 to the heater 25, and then through a safety thermostat 79 to a conductor 80 leading back through a switch 81 to conductor 53 to complete the circuit. Switch 81 is controlled by the centrifugal member 59, being closed only when the motor has come up to speed so that there can be no energization of heater 25 except when motor 46 is operating properly.

Thermostat 75 may be of any suitable type, but in any event it should be positioned so that it senses a temperature proportional to that of clothes in drum 8. A suitable position for this is, for instance, shown in FIGURE 1 wherein the sensing element of thermostat 75 is positioned just below door 3 on the inside wall of member 33. As long as thermostat 75 does not sense a predetermined high temperature indicating either complete dryness or surface dryness of the clothes, the contact arm 74 continues to engage contact 76. However, when the predetermined temperature is sensed, then contact arm 74 is tripped in the conventional manner to engage contact 77.

This opens the circuit to heater 25 so that the heater is shut off. In addition, it completes an operating circuit for timer motor 69 which heretofore was de-energized. This operating circuit proceeds from contact 74 through conductor 82 to the timer motor and then back to conductor 54. The timer motor runs until thermostat 75 cools sufficiently for contact arm 74 to trip back to its normal position in engagement with contact 76. The timer motor then stops, and the heater then starts to operate again, unless the operation of the timer motor had continued for a sufficient length of time to cause cam 71 to open switch 67 and thereby terminate the cycle.

This alternating sequence of operation of heater and timer continues until cam 71 opens switch 67. It has been found that for some fabrics a very short period of time on timer 69, so that only one operation of heater 25 is provided, is suitable as in the case of synthetic fabrics. On the other hand, in the case of regular cotton fabrics and heavy fabrics like shag rugs, longer periods of time may be desirable on timer 69 to permit moisture within the fabric to move out to the surface where it can be vaporized.

This type of circuit is effective to terminate the operation of the machine automatically in response to dryness of the clothes since, as is well known, the clothes when dry will not be able to prevent the temperature from rising; however, when they are wet moisture evaporation absorbs a major part of the energy provided by heaters 25 and the temperature does not rise to the trip temperature of thermostat 75 until most of the moisture has gone. It will be recognized that the critical factor in such a system is actually the extent to which the temperature of the clothes is raised, rather than the absolute temperature of the clothes. For this reason, variations in the temperature of the incoming air can affect the accuracy of the operation, and so compensation for variations in ambient temperature is often provided.

In order to effect this compensation, a biasing resistance-type heater 84 is provided in conjunction with thermostat 75 so that a predetermined amount of heat is provided by the biasing heater to the thermostat. The biasing heater 84 is so controlled that with increases in ambient temperature the heating effect of heater 84 decreases, and with decreases in ambient temperature the heating effect of heater 84 increases. This has the result of requiring a higher clothes temperature to trip thermostat 75 as the ambient increases, and a lower clothes temperature to trip thermostat 75 as the ambient decreases, the desired result.

It is known to use a thermistor, that is, a resistor whose resistance varies substantially with change in temperature, for the control of biasing heater 84. Such a resistor may, for instance, be positioned as shown in FIGURE 1 at 86 so as to be directly responsive to the temperature of the air drawn into the machine through opening 86a; this air is, of course, representative of the ambient temperature. Heretofore, when a thermistor has been provided, it has been in direct control of the biasing heater and directly included in the operating circuit. As a result, it was most difficult to prevent self-heating of the thermistor as a result of the current passing through it.

In order to overcome these disadvantages, I provide a special arrangement for the control of biasing heater 84. Included in induction motor 46 is an extra auxiliary winding 87 which is controlled by a normally closed switch 88 movable at the same time as switch 64. In other words, switch 88 is opened when switch 64 is closed by pulling out on member 6, and returns to its closed position when member 6 is released and switch 64 opens. Winding 87 is formed to provide a low voltage output, and this output is provided across thermistor 86 and an additional resistor 89 at junction points 90 and 91 respectively.

The junction 98 between thermistor 86 and resistor 89 is connected to the base 93 of a transistor generally indicated by the numeral 94. Junction 91 is connected to the collector 95 of the transistor, and junction 90 is connected through the biasing heater 84 to the emitter 96 of the transistor.

The output of winding 87 is, of course, alternating current and it will be understood that either a separate rectifier, such as a diode (not shown), may be included in the circuit or else the transistor 94 may be used as a self-rectifier; in this connection, it is known that there are compositions which may be used in order to provide suitable reverse voltage protection to transistors so as to permit them to be self-rectifying. One such type of transistor is, for instance, sold by the Sylvania and Motorola companies under the model number ZN554.

The thermistor 86 is, in this case, of the type which has a negative coefficient of temperature, that is, as the temperature increases in the range of use of the thermistor its resistance decreases substantially, and as a result the voltage drop across it decreases. The decrease in the voltage drop across the thermistor decreases the bias of the transistor in the forward direction, and as a result there is a decrease in the amount of current passing from the emitter 96 to the collector 95. This in turn results in less heat output from the biasing heater 84, and thermostat 75 therefore requires more heat from the clothes before it trips. In other words, an increase in ambient temperature, by causing a decrease in resistance of the thermistor, causes an increase in the clothes temperature required to trip contact 74 into engagement with contact 77. By the same token, a decrease in ambient temperature has the converse effect and contact 74 will trip into engagement with contact 77 at a lower clothes temperature. The formation of winding 87 and the relative values of the resistances may be made such that thermistor 86 has virtually no self-heating at all, thereby eliminating an undesirable source of error.

An additional highly desirable result of my structure is that the inclusion of the biasing heater 84 in the emitter loop of the transistor, rather than in the collector loop as would be more conventional has a stabilizing effect. Therefore this arrangement constitutes a preferred embodiment of my invention, although it will be understood that in the broader aspect it would be possible to include the biasing heater 84 in the collector loop, provided a suitable stabilizing resistance were included in the emitter loop. Yet a further advantage of my invention accrues from the provision of switch 88 in series with winding 87. During starting there may be voltage transients in the motor which are undesirably high and might be harmful to the transistor. With the arrangement shown, winding 87 is open during starting of the motor, and therefore winding 87 can serve as a source of energization only during running of the motor, not during starting thereof. As previously mentioned, winding 87, while shown as being entirely separate, could also be formed as a tapped portion of the start winding; consequently, the term "auxiliary winding" as used herein would include such an arrangement.

It will thus be seen from the foregoing that an effective thermistor-type compensating arrangement is provided in a dryer control circuit by my invention. The circuit is self-protecting, and in addition precludes self-heating of the thermistor.

It will be understood that various modifications are obvious in the compensating circuit shown. For instance, thermistor 86 could, if it were a positive temperature coefficient thermistor, be put in the present position of resistor 89, and the resistor 89 moved to the position of the thermistor. By the same token, resistor 89 could be made to have a conductivity variable with its temperature, and while this would make calibration of the system more difficult the system would nonetheless achieve my desired results in the same way that I do so. Also, by cascading two or more transistors, rather than just using one, even lower power levels may be used for thermistor 86.

Thus, while in accordance with the patent statutes I have described what at present is considered to be the preferred embodiment of my invention, it will be obvious to those skilled in the art that various changes and modifications (including but not limited to those described above) may be made therein without departing from the invention, and it is therefore aimed in the appended claims to cover all such equivalent variations as fall within the true spirit and scope of my invention.

What I claim as new and desire to secure by Letters Patent of the United States is:

1. In a clothes drying machine:
   (a) a clothes container;
   (b) means including an electric motor for effecting tumbling of clothes in said container, said motor including an auxiliary winding providing a low-voltage output;
   (c) a main heater positioned to heat clothes in said container;
   (d) thermostatic means responsive to the temperature of clothes in said container and effective to shut off said main heater in response to a predetermined high temperature;
   (e) a transistor having a base, an emitter, and a collector;
   (f) means for rectifying the output of said auxiliary winding;
   (g) a variable first resistor having a resistance which varies substantially as its temperature varies and connected at one end to said transistor base, said resistor being positioned to sense ambient air temperature;
   (h) a second resistor connected at one end to said transistor base, said auxiliary winding being connected across the other ends of said resistors;
   (i) an electric resistance-type biasing heater positioned in heating relation to said thermostatic means so as to decrease the clothes temperature required to shut off said main heater;
   (j) one of said resistors having its other end connected to said emitter in an emitter loop, and the other of said resistors having its other end connected to said collector in a collector loop;
   (k) said biasing heater being connected with one of said resistors in one of said loops, said auxiliary winding being connected between said one resistor and said biasing heater;
   (l) whereby a change in the resistance of said variable resistor causes a change in the level of energization of said biasing heater so that the clothes temperature required to shut off said main heater rises and falls as the ambient temperature rises and falls.

2. The apparatus defined in claim 1 wherein said means for rectifying the output of said auxiliary winding is included in said transistor by having said transistor formed as a self-protecting self-rectifying transistor.

3. The apparatus defined in claim 1 wherein said first resistor and said biasing heater are in the emitter loop.

4. The apparatus defined in claim 1 wherein said biasing heater is in the emitter loop.

5. The apparatus defined in claim 1 including manual means for starting operation of said motor, and a normally closed switch in series with said auxiliary winding, said normally closed switch being opened by said manual means so that said auxiliary winding is always open during starting of said motor.

6. In a clothes drying machine:
   (a) a clothes container;
   (b) means including an electric motor for effecting tumbling of clothes in said container, said motor including an auxiliary winding providing a low-voltage output;
   (c) a main heater positioned to heat clothes in said container;

(d) sequence control means including a timer and switch means controlled by said timer for controlling operation of said motor and said heater, (e) manual means for moving said sequence control means to a position wherein said switch means is closed, said timer motor causing said switch means to open after a predetermined period of operation of said timer motor;

(f) thermostatic means responsive to the temperature of the clothes in said container, said thermostatic means being effective to shut off said main heater and start operation of said timer motor in response to a predetermined high temperature, said thermostatic means being effective to shut off said timer motor and start operation of said main heater when the temperature decreases to a predetermined level;

(g) a transistor having a base, an emitter and a collector;

(h) means for rectifying said output of said auxiliary winding;

(i) a variable first resistor having a resistance which varies substantially as its temperature varies and connected at one end to said transistor base, said transistor being positioned to sense ambient air temperature;

(j) a second resistor connected at one end to said transistor base, said auxiliary winding being connected across the other ends of said resistors;

(k) an electric resistance-type biasing heater positioned in heating relation to said thermostatic means so as to decrease the clothes temperature required to shut off said main heater;

(l) one of said resistors having its other end connected to said emitter in an emitter loop, and the other of said resistors having its other end connected to said collector in a collector loop;

(m) said biasing heater being connected with one of said resistors in one of said loops, said auxiliary winding being connected between said one resistor and said biasing heater;

(n) whereby a change in the resistance of said variable resistor causes a change in the level of energization of said biasing heater so that the clothes temperature required to shut off said main heater and start said timer motor and the clothes temperature required to shut off said timer motor and start said main heater rise and fall as the ambient temperature rises and falls.

References Cited by the Examiner

UNITED STATES PATENTS

| | | | |
|---|---|---|---|
| 2,872,595 | 2/1959 | Pinckaers | 307—88.5 |
| 3,122,358 | 2/1964 | Cobb et al. | 34—45 X |
| 3,186,107 | 6/1965 | Raley | 34—45 |

WILLIAM F. O'DEA, *Primary Examiner.*

JOHN J. CAMBY, *Examiner.*